United States Patent
Inokuchi et al.

(10) Patent No.: US 9,920,801 B2
(45) Date of Patent: Mar. 20, 2018

(54) BRAKE PAD AND CALIPER DEVICE

(71) Applicant: SUMITOMO BAKELITE COMPANY LIMITED, Tokyo (JP)

(72) Inventors: Hideaki Inokuchi, Tokyo (JP); Hidemi Yazawa, Tokyo (JP)

(73) Assignee: SUMITOMO BAKELITE COMPANY LIMITED, Tokyo (JP)

( * ) Notice: Subject to any disclaimer, the term of this patent is extended or adjusted under 35 U.S.C. 154(b) by 0 days.

(21) Appl. No.: 14/765,013

(22) PCT Filed: Jan. 28, 2014

(86) PCT No.: PCT/JP2014/051846
§ 371 (c)(1),
(2) Date: Jul. 31, 2015

(87) PCT Pub. No.: WO2014/119573
PCT Pub. Date: Aug. 7, 2014

(65) Prior Publication Data
US 2015/0377308 A1    Dec. 31, 2015

(30) Foreign Application Priority Data
Feb. 1, 2013   (JP) ................. 2013-018656

(51) Int. Cl.
*F16D 69/00*    (2006.01)
*F16D 65/092*    (2006.01)
(Continued)

(52) U.S. Cl.
CPC .......... *F16D 65/092* (2013.01); *F16D 55/14* (2013.01); *F16D 55/2245* (2013.01);
(Continued)

(58) Field of Classification Search
CPC .... F16D 65/092; F16D 69/026; F16D 69/048; F16D 2069/0466; F16D 69/0416;
(Continued)

(56) References Cited

FOREIGN PATENT DOCUMENTS

| EP | 1 605 181 A1 | 12/2005 |
|---|---|---|
| GB | 2 143 916 A | 2/1985 |

(Continued)

OTHER PUBLICATIONS

International Search Report dated Mar. 11, 2014, issued in counterpart application No. PCT/JP2014/051846 (2 pages).

*Primary Examiner* — Pamela Rodriguez
(74) *Attorney, Agent, or Firm* — Westerman, Hattori, Daniels & Adrian, LLP

(57) ABSTRACT

A brake pad 10 can brake a rotation of a disc 200. The brake pad 10 includes a friction material 12 provided on the side of the disc 200 and a back plate 11 bonded to the friction material 12 on the opposite side of the disc 200. A thickness of a central region of the back plate 11 in a rotational direction of the disc 200 is larger than thicknesses of both end regions of the back plate 11 in the rotational direction of the disc. In the case where a minimum value of the thicknesses of the end regions of the back plate 11 is defined as "$h_1$ [mm]" and a maximum value of the thickness of the central region of the back plate 11 is defined as "$h_2$ [mm]", $h_1$ and $h_2$ preferably satisfy a relationship of "$h_2 - h_1 < 3$".

10 Claims, 4 Drawing Sheets

(51) Int. Cl.
*F16D 69/04* (2006.01)
*F16D 69/02* (2006.01)
*F16D 55/224* (2006.01)
*F16D 55/14* (2006.01)

(52) U.S. Cl.
CPC ............ *F16D 69/026* (2013.01); *F16D 69/04* (2013.01); *F16D 69/0416* (2013.01); *F16D 2069/004* (2013.01); *F16D 2069/045* (2013.01); *F16D 2069/0441* (2013.01); *F16D 2200/0065* (2013.01); *F16D 2200/0069* (2013.01); *F16D 2200/0086* (2013.01)

(58) Field of Classification Search
CPC ............ F16D 55/2265; F16D 55/2245; F16D 2069/045; F16D 69/04; F16D 55/14; F16D 2069/004; F16D 2069/0441; F16D 2200/0065; F16D 2200/0069; F16D 2200/0086

USPC ............ 188/258, 72.4, 73.1, 250 B, 250 G, 188/250 R, 251 A, 251 R
See application file for complete search history.

(56) References Cited

FOREIGN PATENT DOCUMENTS

| | | |
|---|---|---|
| JP | 57-24335 U | 2/1982 |
| JP | 60-2030 U | 1/1985 |
| JP | 60-19830 U | 2/1985 |
| JP | 2-56926 U | 4/1990 |
| JP | 9-177845 A | 7/1997 |
| JP | 2009-174568 A | 8/2009 |
| JP | 2010-48387 A | 3/2010 |
| JP | 2012-36932 A | 2/2012 |
| JP | 2013-127305 A | 6/2013 |

BRAKE PAD AND CALIPER DEVICE

TECHNICAL FIELD

The present invention relates to a brake pad and a caliper device.

BACKGROUND ART

A disc brake has a disc and brake pads, and generally each brake pad includes a lining (friction material) for braking the disc and a back plate for supporting the lining. Since this back plate supports the lining, it is required to have heat resistance, brake resistance, and high mechanical strength in a high temperature atmosphere. For this reason, conventionally, plates made of ceramic or plates made of metal have been used for the back plate. However, when the plates made of ceramic and the plates made of metal are used for the back plate, there are problems such as a heavy weight, a long time required for machining, high costs, and the like.

Therefore, recently, it is attempted to use a plate made of a synthetic resin mixed with fibers for the back plate instead of the plates made of metal for the purpose of reducing both weight and cost.

As technology relating to this type of back plate, Patent Document 1 discloses a back plate that uses a carbon fiber reinforced plastic plate.

However, since a conventional brake pad has low bonding strength between the lining and the back plate, it is difficult to obtain enough durability of the brake pad. In particular, there is a problem in that the conventional brake pad does not exhibit enough bending rigidity.

PRIOR ART DOCUMENT

Patent Document

The Patent Document 1 is JP-A 2010-48387

SUMMARY OF THE INVENTION

Problem to be Solved by the Invention

An object of the present invention is to provide a brake pad having high bonding strength between a friction material and a back plate and having excellent durability and bending rigidity, and a caliper device provided with the brake pad.

Means of Solving the Problem

In order to achieve such an object, the present invention includes the following features (1) to (9).

(1) A brake pad for braking a rotation of a disc, the brake pad comprising:
   a friction material provided on the side of the disc; and
   a back plate bonded to the friction material on the opposite side of the disc,
   wherein a thickness of a central region of the back plate in a rotational direction of the disc is larger than thicknesses of both end regions of the back plate in the rotational direction of the disc.

(2) The brake pad according to the above feature (1), wherein in the case where a minimum value of the thicknesses of the end regions of the back plate is defined as "$h_1$ [mm]" and a maximum value of the thickness of the central region of the back plate is defined as "$h_2$ [mm]", $h_1$ and $h_2$ satisfy a relationship of "$h_2 - h_1 < 3$".

(3) The brake pad according to the above feature (1) or (2), wherein a minimum value of the thicknesses of the end regions of the back plate is in the range of 3 to 5 mm.

(4) The brake pad according to any one of the above features (1) to (3), wherein a maximum value of the thickness of the central region of the back plate is in the range of 4 to 7 mm.

(5) The brake pad according to any one of the above features (1) to (4), wherein the thickness of the back plate continuously increases toward the central region from each of the end regions.

(6) The brake pad according to any one of the above features (1) to (5), wherein the back plate is formed of a back-plate composition including a resin and a plurality of fibers.

(7) The brake pad according to the above feature (6), wherein the fibers are glass fibers.

(8) The brake pad according to the above feature (6) or (7), wherein the resin contains at least one type selected from the group consisting of phenol resin, epoxy resin, bismaleimide resin, benzoxazine resin, and unsaturated polyester resin.

(9) A caliper device comprising:
   the brake pad defined by any one of the above features (1) to (8);
   a piston that presses the brake pad toward a disc; and
   a caliper in which the piston is put so as to be movable.

Effect of the Invention

According to the present invention, it is possible to provide the brake pad having the high bonding strength between the friction material and the back plate and having the excellent durability, and the caliper device provided with the brake pad.

MODE FOR CARRYING OUT THE INVENTION

Description will be made on a brake pad and a caliper device of the present invention in detail based on preferred embodiments shown in the attached drawings.

First, the caliper device of the present invention will be described in detail.

[Caliper Device]

Figure 1:
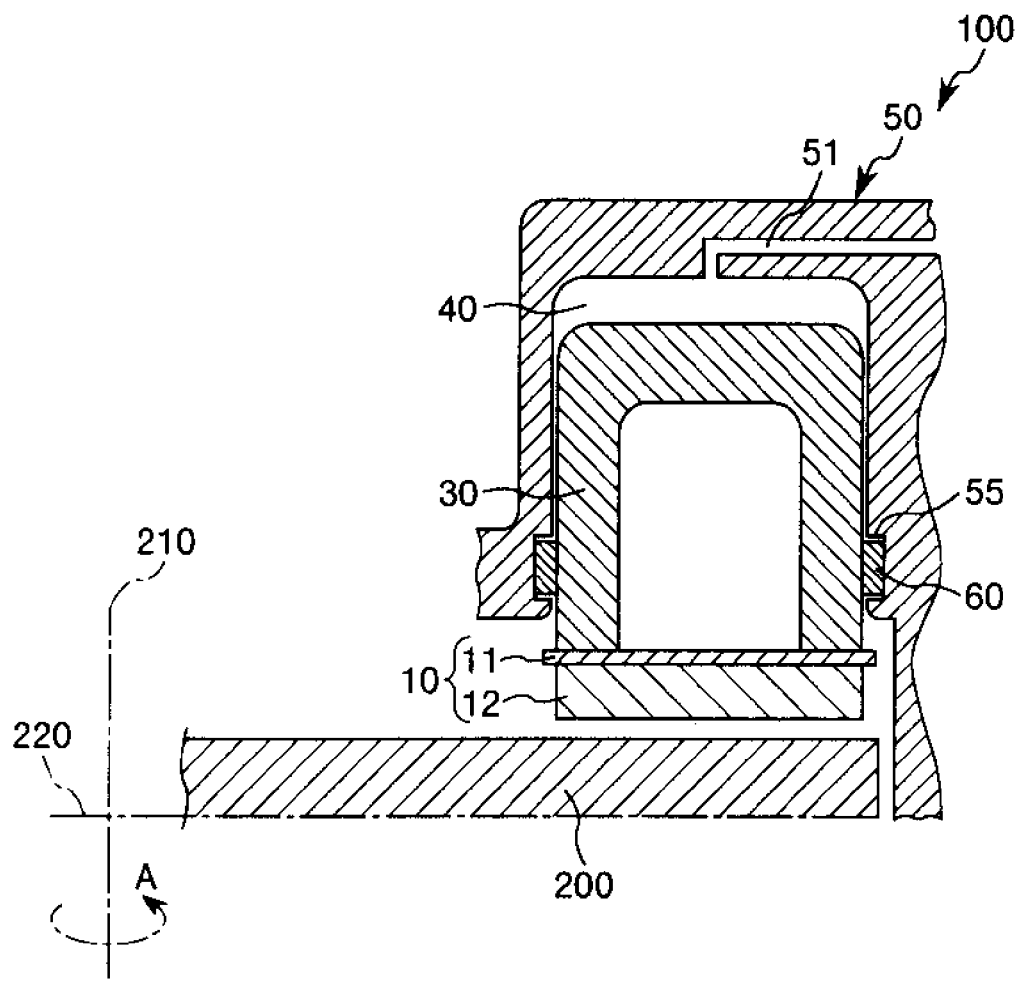
FIG. 1 is a cross-sectional view showing one example of a caliper device.
Figure 2:
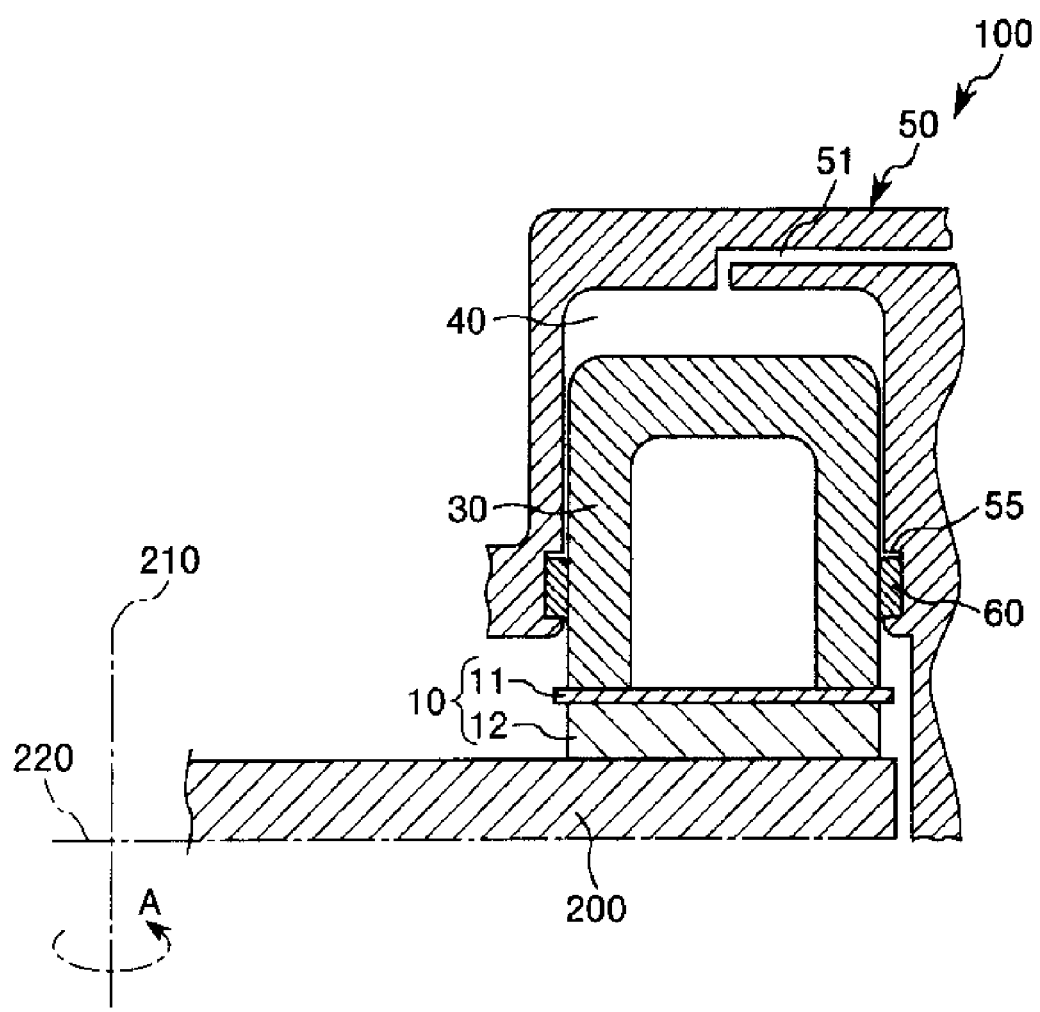
FIG. 2 is a cross-sectional view showing one example of the caliper device.

Each of FIG. 1 and FIG. 2 is a cross-sectional view showing one example of the caliper device of the present invention. Each of FIG. 1 and FIG. 2 is a view showing the caliper device in a state of being arranged corresponding to a disc. In this regard, FIG. 1 is a view showing a state that the disc is not braked (released), and FIG. 2 is a view showing a state that the disc is braked by the caliper device. In this regard, in the following description, the upper side of FIG. 1 is referred to as the "top", and the lower side thereof is referred to as the "bottom".

A caliper device 100 shown in FIGS. 1 and 2 is used for braking a rotating (revolving) disc 200. As shown in FIGS. 1 and 2, the disc 200 rotates about a rotation axis 210 in a direction indicated by an arrow A.

The caliper device 100 is provided adjacent to the disc 200. This caliper device 100 includes a caliper 50, a piston 30, and a brake pad 10.

The caliper 50 serves as a casing in which the piston 30 is put. As shown in FIGS. 1 and 2, the caliper 50 has a space 40 opening on the bottom side, and a flow channel 51 communicating with the space 40. The space 40 is of a cylindrical shape, and the piston 30 is put (housed) in the space 40.

A ring-shaped groove 55 is formed on an inner circumferential surface of the caliper 50 defining the space 40. Inside the groove 55, provided (inserted) is a ring-shaped seal member 60 formed of an elastic material. Moreover, the seal member 60 makes pressure contact with an outer circumferential surface of the piston 30 such that the piston 30 can slide.

In this regard, the single seal member 60 is provided in the space 40 in this embodiment, but the number of the seal members is not limited thereto. For example, two or more seal members may be parallel provided along a vertical direction of FIG. 1 in the space 40. Further, in this regard, the number of the seal members may be appropriately set depending on the intended purpose of the caliper device 100, required performance thereof, and the like.

The seal structure formed by such a seal member is also obviously not limited to the illustrated structure.

The piston 30 has a function of pressing the brake pad 10 toward the disc 200.

As described above, the piston 30 is put in the space 40, and the seal member 60 makes pressure contact with the outer circumferential surface of the piston 30. Therefore, the space 40 is liquid-tightly sealed by the seal member 60.

The space 40 is filled with a brake fluid. In the caliper device 100, the brake fluid can be supplied into the space 40 and discharged out of the space 40 via the flow channel 51 by using a hydraulic device not illustrated. By providing the seal member 60, it is possible to prevent leakage of the brake fluid out of the space 40 and penetration of foreign substance into the space 40.

The brake pad 10 has a function of controlling the rotation of the disc 200 (decreasing a rotational speed thereof) due to a frictional force generated between the brake pad 10 and the disc 200 by being made pressure contact with the disc 200 during braking.

The brake pad 10 is provided between the piston 30 and the disc 200. The brake pad 10 is composed of a bonded body in which a back plate 11 and a friction material 12 are bonded together. The back plate 11 is positioned on the side of the piston 30, and the friction material 12 is positioned on the side of the disc 200. A top surface of the back plate 11 makes contact with a bottom surface of the piston 30. In this regard, the top surface of the back plate 11 and the bottom surface of the piston 30 may be bonded or not bonded together. Moreover, a bottom surface of the friction material 12 faces a top surface of the disc 200.

The caliper device of the present invention can be used for either an opposing type caliper device or a floating type caliper device.

In the case of the opposing type caliper device, while not illustrated, a control mechanism having the same configuration as a control mechanism including the above mentioned space 40, piston 30 and brake pad 10 is provided on the bottom side of the disc via a center line 220 of the disc 200 (with a mirror image arrangement). In other words, in the case of the opposing type caliper device, a pair of control mechanisms each including the space, the piston and the brake pad is provided via the disc 200. According to the opposing type caliper device having such a configuration, both the brake pads provided in a pair move with respect to the caliper 50 and sandwich the disc 200, to thereby brake the rotation of the disc 200. Moreover, the number of sets (the number of pairs) of such control mechanisms is not limited to one set, and may be, for example, a plurality of sets such as two sets or three sets.

On the other hand, in the case of the floating type caliper device, while not illustrated, a brake pad having the same configuration as the above mentioned brake pad 10 is provided on the bottom side of the disc 200 via the center line 220 of the disc 200, and fixed to the caliper 50 at this position. In other words, a pair of brake pads including the brake pad 10 movable with respect to the caliper 50 and the brake pad fixed to the caliper 50 is provided via the disc. Moreover, the number of sets (the number of pairs) of the brake pads is not limited to one set, and may be, for example, a plurality of sets such as two or three sets.

Next, operation of the caliper device 100 will be described.

In the caliper device 100, during non-braking (in an initial state), the bottom surface of the friction material 12 is separated at a slight distance from the top surface of the disc 200.

From this state, when braking the rotating disc 200, the brake fluid is supplied into the space 40 via the flow channel 51 by using the above mentioned hydraulic device. At this time, a pressure (a fluid pressure) of the brake fluid with respect to the piston 30 in the space 40 increases, so that the piston 30 moves toward the disc 200. At the same time, the brake pad 10 also moves downward in FIG. 1 along with the moving piston 30, and as shown in FIG. 2, the friction material 12 thereof makes pressure contact with the disc 200. As a result, the frictional force is generated between the friction material 12 of the brake pad 10 and the disc 200, and thus the rotation of the disc 200 is suppressed.

In this regard, when the piston 30 has moved to the side of the disc due to the increase of the fluid pressure of the brake fluid in the space 40, a portion of the seal member 60 that makes pressure contact with the piston 30 is pulled to the side of the disc 200, so that the seal member 60 undergoes elastic deformation.

On the other hand, when releasing the braking of the disc 200, the supply of the brake fluid into the space 40 by using the hydraulic device is stopped, or the brake fluid is transferred from the space 40 via the flow channel 51 to the hydraulic device. By doing so, a part of the brake fluid in the space 40 is discharged out of the space 40 via the flow channel 51, to thereby decrease the pressure (the fluid pressure) of the brake fluid with respect to the piston 30. For this reason, a force pressing the piston 30 toward the disc 200 decreases, so that the seal member 60 becomes deformed to the non-braking state due to a restoring force thereof. This allows the piston 30 to move in a direction of separating from the disc 200 (upward). At this time, the bottom surface of the friction material 12 separates from the top surface of the disc 200, or a pressure contact force of the bottom surface of the friction material 12 to the top surface of the disc 200 decreases. As a result, the braking of the disc 200 is released.

In the case where the caliper device of the present invention is the opposing type, the respective pistons and brake pads, which are provided opposite to each other via the center line 220 of the disc 200, operate in the same manner as described above both during braking and during releasing the braking. In the case of the opposing type caliper device, it is possible to obtain a larger braking force by sandwiching the disc 200 from both sides by at least one pair of brake pads during braking.

Further, in the case of the floating type, the disc 200 is braked by being sandwiched by the brake pad 10 movable with respect to the caliper 50 and the brake pad fixed to the caliper 50. In other words, when the brake pad 10 moves and presses the disc 200, the caliper 50 moves in a direction separating from the disc 200 (upward) due to a reaction force thereof. By the upward moving of the caliper 50, the brake pad (not illustrated) also provided opposite to the brake pad 10 and fixed to the caliper 50 moves upward, namely, in a direction approaching the disc 200, and presses the disc 200. As a result, the disc 200 is sandwiched and braked by the movable brake pad 10 and the fixed brake pad.

The intended purpose of the caliper device of the present invention is not particularly limited, and the device can be used in, for example, airplanes, vehicles (automobiles), motorcycles, bicycles, rail cars, elevators, robots, construction machineries, agricultural machineries, other industrial machineries, and the like.

[First Embodiment of Brake Pad]

Next, a first embodiment of the brake pad provided in the caliper device of the present invention will be described.

Figure 3:
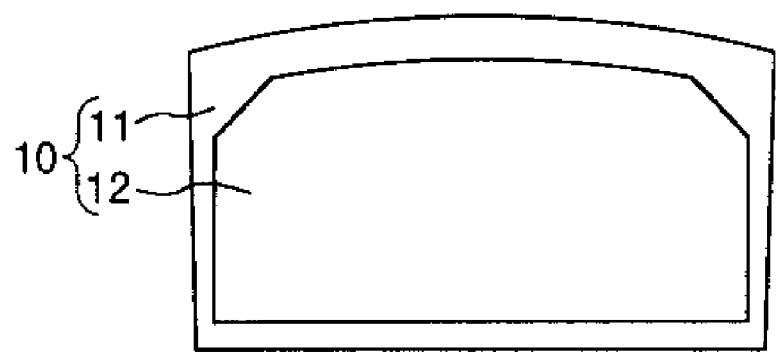
FIG. 3 is a planar view showing the first embodiment of the brake pad of the present invention.
Figure 4:
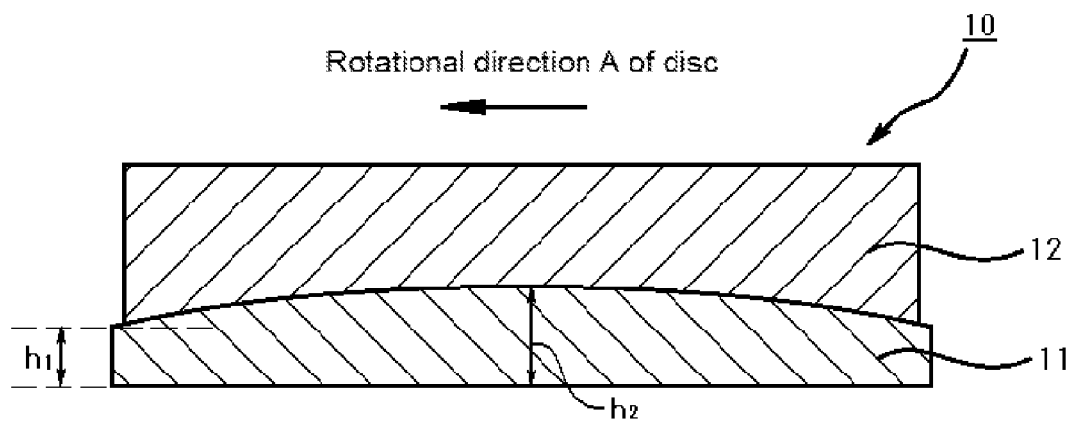
FIG. 4 is a cross-sectional view showing a first embodiment of a brake pad of the present invention.
Figure 5:
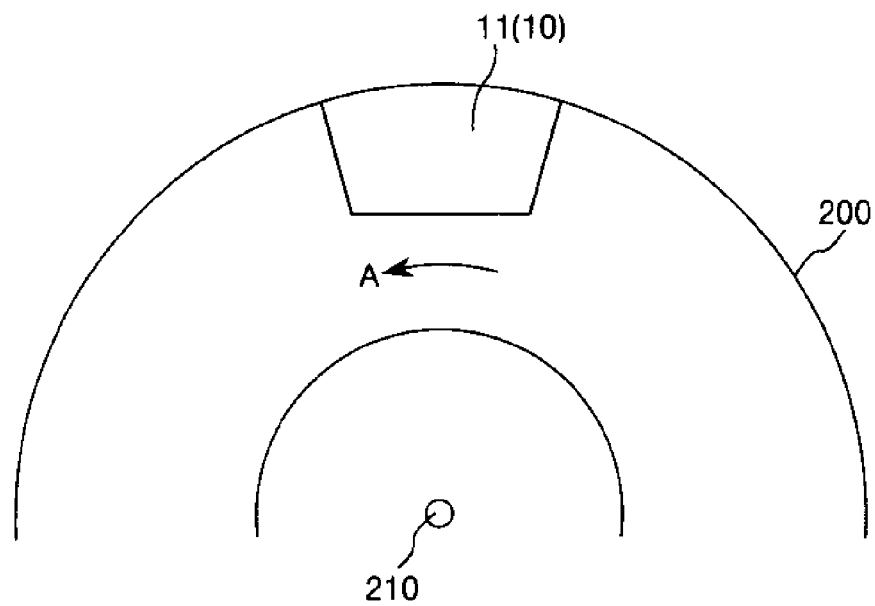
FIG. 5 is an illustration showing the brake pad of the present invention in a state of being arranged corresponding to a disc.

FIG. 3 is a planar view showing the first embodiment of the brake pad of the present invention. FIG. 4 is a cross-sectional view showing the first embodiment of the brake pad of the present invention. FIG. 5 is an illustration showing the brake pad of the present invention in a state of being arranged corresponding to the disc. In this regard, a "rotational direction of the disc 200" described below means a rotational direction of the disc 200 at a position where the brake pad 10 is attached to the piston 30 of the caliper device 100, and is a direction indicated by an arrow A in FIGS. 4 and 5.

The brake pad of the present invention can control the rotation of the disc due to the frictional force generated between the brake pad and the disc by being made contact with the disc during braking.

As described above, the brake pad 10 is composed of the bonded body in which the back plate 11 and the friction material 12 are bonded together. In this embodiment, as shown in FIG. 4, thicknesses of both ends (both end regions) of the back plate 11 in the rotational direction of the disc 200 are substantially equal to each other, and the thicknesses of the both ends are smaller than a thickness of a substantial center (a central region) of the back plate 11 in the rotational direction of the disc 200. Namely, the thickness of the substantial center of the back plate 11 in the rotational direction of the disc 200 (in FIG. 4, a thickness indicated by "$h_2$") is larger than the thicknesses of the both ends of the back plate 11 in the rotational direction of the disc 200 (in FIG. 4, a thickness indicated by "$h_1$").

In other words, as shown in FIG. 4, a surface (a surface making contact with the piston 30) of the back plate 11 opposite to a surface (a bonding surface) thereof, to which the friction material 12 is bonded, is formed into a substantially flat surface, and the bonding surface thereof is formed into a convex curved surface protruding toward the side of the friction material 12 (the disc 200). Namely, the substantial center of the back plate 11 in the rotational direction of the disc 200 protrudes toward the side of the friction material 12. On the other hand, a substantial center of a surface (a bonding surface) of the friction material 12, to which the back plate 11 is bonded, in the rotational direction of the disc 200 is recessed toward the side of the disc 200 so as to correspond to the shape of the bonding surface of the back plate 11.

The back plate 11 and the friction material 12 are bonded together in a state that the bonding surface (the convex curved surface) of the back plate 11 and the bonding surface of the friction material 12 make close contact with each other. In such a bonded body, a contact area between the back plate 11 and the friction material 12 can be increased in comparison with a case where both the bonding surface of the back plate and the bonding surface of the friction material are formed into flat surfaces. Therefore, it is possible to improve bonding strength between the back plate 11 and the friction material 12. Further, it is also possible to improve durability of the back plate 11 against a force applied thereto in the rotational direction of the disc 200. Furthermore, by increasing the thickness of the central region of the back plate 11, it is possible to enhance bending rigidity of the back plate 11. This makes it possible to improve bending rigidity of the whole brake pad 10.

In this embodiment, as shown in FIG. 4, the thickness of the back plate 11 continuously increases toward the central region thereof in the rotational direction of the disc 200 from each of the ends (each of the end regions) thereof in the rotational direction of the disc 200. By this configuration, it is possible to more enhance the bending rigidity of the back plate 11, while improving the durability of the back plate 11 against the force applied thereto in the rotational direction of the disc 200.

Further, in the case where a minimum value of the thicknesses of the end regions of the back plate 11 is defined as "$h_1$ [mm]" and a maximum value of the thickness of the central region of the back plate 11 is defined as "$h_2$ [mm]", $h_1$ and $h_2$ preferably satisfy a relationship of "$h_2-h_1<3$", and more preferably satisfy a relationship of "$1<h_2-h_1<3$". By satisfying such a relationship, it is possible to further improve the bonding strength between the back plate 11 and the friction material 12. Further, it is also possible to more effectively improve the durability of the back plate 11 against the force applied thereto in the rotational direction of the disc 200. In contrast, if the value "$h_2-h_1$" exceeds the above upper limit value, there is a fear that the thickness of the central region of the friction material 12 in the rotational direction of the disc 200 cannot be sufficiently increased depending on a size and the like of the brake pad 10.

The minimum value of the thicknesses of the end regions of the back plate 11 is preferably in the range of 3 to 5 mm, and more preferably in the range of 4 to 5 mm. This makes it possible to reduce a weight of the brake pad 10 and to more effectively improve the durability of the back plate 11 against the force applied thereto in the rotational direction of the disc 200.

The maximum value of the thickness of the central region of the back plate 11 is preferably in the range of 4 to 7 mm, and more preferably in the range of 5 to 6 mm. This makes it possible to reduce a weight of the brake pad 10, and to further enhance the bending rigidity of the back plate 11.

Moreover, in this embodiment, as shown in FIG. 3, a planar shape of the brake pad 10 (the friction material 12 and the back plate 11) is a substantially quadrilateral shape.

Furthermore, the friction material 12 has a planar size smaller than a planar size of the back plate 11, and is positioned so as to be included within the back plate 11 in the planar view.

In this regard, each of the planar shapes of the friction material 12 and the back plate 11 is the substantially quadrilateral shape in this embodiment, but is not limited thereto. Each of the planar shapes of the friction material 12 and the back plate 11 may be, for example, a substantially circular shape, a polygonal shape, or the like. Furthermore, these planar shapes may also be, respectively, different shapes. In this regard, these planar shapes may be appropriately set depending on the intended purpose of the brake pad 10.

Further, the thickness of the back plate 11 continuously increases toward the substantial center (the central region) thereof in the rotational direction of the disc 200 from each of the ends (each of the end regions) thereof in the rotational direction of the disc 200 in the above description, but may intermittently increase toward the substantial center from each of the ends.

Hereinafter, constituent materials of the friction material 12 and the back plate 11 included in the brake pad 10 will be described in detail.

<Friction Material 12>

The friction material 12 has a function of suppressing the rotation of the disc 200 due to friction generated by being made contact with the disc 200 during braking.

When the friction material 12 makes contact with the disc 200 during braking, it generates frictional heat due to the friction between the friction material 12 and the disc 200. Therefore, it is preferred that the constituent material of the friction material 12 has excellent heat resistance in order to resist the frictional heat during braking. Concrete examples of the constituent material thereof include, but are not particularly limited to, mixtures containing fiber materials such as rock wool, Kevlar fiber and copper fiber; bonding materials such as a resin; and fillers such as barium sulfate, zirconium silicate, cashew dust and graphite.

Moreover, an average thickness of the friction material 12 is not particularly limited, but is preferably in the range of 3 to 15 mm, and more preferably in the range of 5 to 12 mm. If the average thickness of the friction material 12 is less than the above lower limit value, there is a case that mechanical strength of the friction material 12 is reduced depending on the constituent material thereof and the like, so that it easily breaks and thus becomes a short life-span. On the other hand, if the average thickness of the friction material 12 exceeds the above upper limit value, there is a case that the entire caliper device 100 including the friction material 12 becomes a slightly large size.

The back plate 11 is hard and has high mechanical strength. For this reason, the back plate 11 is difficult to be deformed, and thus can reliably support the friction material 12 and uniformly transmit a pressing force of the piston to the friction material 12 during braking. Moreover, the back plate 11 can also make it difficult to transmit the frictional heat and vibration, which are generated by sliding contact of the friction material 12 to the disc 200, to the piston during braking.

The back plate 11 is preferably formed of a back-plate composition (a composition for forming the back plate of the brake pad) including a resin and a plurality of fibers. Especially, the back plate 11 more preferably is formed of the back-plate composition including the resin, a plurality of first fibers and a plurality of second fibers.

Hereinafter, the back-plate composition constituting the back plate 11 will be described in detail.

<<Back-Plate Composition>>

Hereinafter, each material constituting the back-plate composition will be described in detail.

(i) Resin

In this embodiment, the back-plate composition contains the resin.

In this regard, in this embodiment, the resin may be in any state such as a solid state, a liquid state, or a semisolid state at room temperature.

Examples of the resin include curable resins such as a thermosetting resin, a photocurable resin, a reactive curable resin and an anaerobically curing resin. Among them, particularly, the thermosetting resin is preferable because it has excellent mechanical properties such as linear expansion coefficient and elastic modulus after curing.

Examples of the thermosetting resin include phenol resin, epoxy resin, bismaleimide resin, urea resin, melamine resin, polyurethane resin, cyanate ester resin, silicone resin, oxetane resin, (meth)acrylate resin, unsaturated polyester resin, diallyl phthalate resin, polyimide resin, benzoxazine resin, and the like. One type of them can be used alone, or two or more types of them can be used in combination. Among them, particularly, the phenol resin, the epoxy resin, the bismaleimide resin, the benzoxazine resin, and the unsaturated polyester resin are preferable, and the phenol resin is more preferable as the thermosetting resin. This makes it possible for the back plate 11 to have particularly excellent heat resistance to the frictional heat generated when the friction material 12 makes contact with the disc 200 during braking.

Examples of the phenol resin include novolac type phenol resins such as phenol novolac resin, cresol novolac resin, bisphenol A novolac resin and aryl alkylene type novolac resin; resol type phenol reins such as unmodified resol phenol resin and resol phenol resin modified by an oil such as tung oil, linseed oil or walnut oil. One type of them can be used alone, or two or more types of them can be used in combination. Among them, particularly, the phenol novolac resin is preferable as the phenol resin. This makes it possible to manufacture the back plate 11 at a low cost and with high dimensional accuracy, and to obtain the back plate 11 having particularly superior heat resistance.

A weight average molecular weight of the phenol resin is not particularly limited, but is preferably in the range of about 1,000 to 15,000. If the weight average molecular weight is less than the above lower limit value, there is a case that it becomes difficult to prepare the back-plate composition due to too low viscosity of the resin. On the other hand, if the weight average molecular weight exceeds the above upper limit value, there is a case that moldability of the back-plate composition decreases because a melt viscosity of the resin becomes high. For example, the weight average molecular weight of the phenol resin can be measured by gel permeation chromatography (GPC), and can be stipulated as a polystyrene-converted weight molecular weight.

Examples of the epoxy resin include bisphenol type epoxy resins such as bisphenol A type epoxy resin, bisphenol F type epoxy resin and bisphenol AD type epoxy resin; novolac type epoxy resins such as phenol novolac type epoxy resin and cresol novolac type epoxy resin; brominated type epoxy resins such as brominated bisphenol A type epoxy resin and brominated phenol novolac type epoxy resin; biphenyl type epoxy resin; naphthalene type epoxy resin; tris(hydroxyphenyl) methane type epoxy resin; and the like. One type of them can be used alone, or two or more types of them can be used in combination. Among them, particularly, the bisphenol A type epoxy resin, phenol novolac type epoxy resin and cresol novolac type epoxy resin each having a relatively low molecular weight are preferable as the epoxy resin. This makes it possible to increase flowability of the back-plate composition. As a result, it is possible to further improve handling property and the moldability of the back-plate composition when manufacturing the back plate 11. Moreover, from the viewpoint of further improving the heat resistance of the back plate 11, the phenol novolac type epoxy resin and the cresol novolac type epoxy resin are preferable, and the tris(hydroxyphenyl) methane type epoxy resin is particularly preferable as the epoxy resin.

The bismaleimide resin is not particularly limited as long as it is a resin having maleimide groups at both ends of a molecular chain thereof, but is preferably a resin having a phenyl group in addition to the maleimide groups. Specifically, as the bismaleimide resin, for example, a resin represented by the following chemical formula (1) can be used. In this regard, the bismaleimide resin may also have a maleimide group bonded at a position other than both ends of the molecular chain thereof.

[Chemical Formula 1]

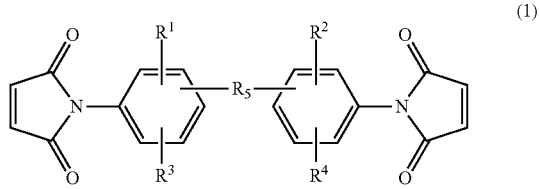

(1)

In the chemical formula (1), each of $R^1$ to $R^4$ is a hydrogen atom or a substituted or unsubstituted hydrocarbon group having a carbon number of 1 to 4, and $R^5$ is a substituted or unsubstituted organic group. Here, the organic group means a hydrocarbon group that may contain a heteroatom such as O, S or N. $R^5$ is preferably a hydrocarbon group having a main chain in which a methylene group(s), an aromatic ring(s) and an ether bond(s) (—O—) are bonded in any order, and is more preferably a hydrocarbon group in which a total number of the methylene group(s), the aromatic ring(s) and the ether bond(s) contained in the main chain thereof is 15 or less. In this regard, the main chain may have a substituent group and/or a side chain bonded in a middle thereof. Concrete examples thereof include a hydrocarbon group having a carbon number of 3 or less, a maleimide group, a phenyl group, and the like.

Specifically, examples of the bismaleimide resin include N,N'-(4,4'-diphenyl methane)bismaleimide, bis(3-ethyl-5-methyl-4-maleimidephenyl) methane, 2,2-bis[4-(4-maleimidephenoxy)phenyl]propane, m-phenylene bismaleimide, p-phenylene bismaleimide, 4-methyl-1,3-phenylene bismaleimide, N,N'-ethylene dimaleimide, N,N'-hexamethylene dimaleimide, and the like. One type of them can be used alone, or two or more types of them can be used in combination.

An amount of the resin contained in the back-plate composition is not particularly limited, but is preferably in the range of 20 to 80 mass %, and is more preferably in the range of 30 to 50 mass %.

If the amount of the resin is less than the above lower limit value, there is a case that the resin cannot have sufficient binding strength with the other materials constituting the back-plate composition (particularly, the first fibers and the second fibers) depending on the types thereof. On the other hand, if the amount of the resin exceeds the above upper limit value, there is a case that amounts of the first fibers and the second fibers described below relatively decreases, and thus effects to be obtained by including the first fibers and the second fibers are not adequately exhibited.

(ii) Fibers

In this embodiment, the back-plate composition includes the plurality of fibers. The plurality of fibers preferably includes the plurality of first fibers, and more preferably includes the plurality of first fibers and the plurality of second fibers.

Namely, the back-plate composition preferably includes a fiber group that is a mass of the plurality of fibers, more preferably includes at least a first fiber group that is a mass of the plurality of first fibers, and even more preferably includes the first fiber group and a second fiber group that is a mass the plurality of second fibers.

The first fibers belonging to the first fiber group have an average length longer than an average length of the second fibers belonging to the second fiber group (in other words, the second fibers belonging to the second fiber group have the average length shorter than the average length of the first fibers belonging to the first fiber group). In this way, in the case where the back-plate composition includes two types of fibers having different average lengths, it is possible to improve the moldability (ease of molding) thereof, and to increase the mechanical strength of the molded back plate 11.

Hereinafter, such first fibers and second fibers will be described in detail.

In the case where the average length of the first fibers is "L1" [μm], and the average length of the second fibers is "L2" [μm], "L2"/"L1" is preferably in the range of 0.001 to 0.5, more preferably in the range of 0.01 to 0.4, and even more preferably in the range of 0.015 to 0.3. If the ratio "L2"/"L1" of the average length "L2" of the second fibers to the average length "L1" of the first fibers is within the above range, it is possible to further improve the moldability of the back-plate composition, and to particularly increase the dimensional accuracy and the mechanical strength of the back plate 11.

When the two types of fibers having different average lengths are compared, the first fibers having lengths longer than lengths of the second fibers contribute primarily to securing the mechanical strength of the back plate 11 and to shape stability of the back plate 11.

On the other hand, the second fibers having the shorter lengths also contribute to the shape stability of the back plate 11, but also assume a role of mainly filling (squeezing) gaps between the first fibers having relatively long lengths. In other words, the second fibers squeeze the gaps between the first fibers, thereby increasing the mechanical strength of the back plate 11 in portions where the first fibers are not present, namely, the second fibers exhibit an action of aiding the effects of the first fibers (reinforcing action). More specifically, because of the lengths of the first fibers, the first fibers have a high tendency to orient along a surface direction of the back plate 11. In contrast, the second fibers squeeze the gaps between the first fibers, but also exhibit a tendency to orient along the surface direction of the back plate 11 and to orient along a direction that differs from the surface direction of the back plate 11. In this way, different orientation states of the first fibers and the second fibers makes it possible to sufficiently impart the mechanical strength and the shape stability to the back plate 11 even if both the first fibers and the second fibers are used in small amounts.

The above function is remarkably exhibited particularly by setting the ratio "L2"/"L1" within the above range. Furthermore, in the case where the first fibers and the second fibers are formed of the same material or the same type of material, this tendency is remarkably obtained.

The average length "L1" of the first fibers is preferably in the range of 5 to 50 mm, and more preferably in the range of 8 to 12 mm. If the average length "L1" of the first fibers is less than the above lower limit value, there is a case that the shape stability of the back plate is not sufficiently obtained depending on the constituent material of the first fibers and an amount thereof. On the other hand, if the average length "L1" of the first fibers exceeds the above upper limit value, there is a case that the flowability of the back-plate composition is not sufficiently obtained when molding the back plate 11.

Moreover, the average length "L2" of the second fibers is preferably in the range of 50 μm to 10 mm, more preferably in the range of 150 μm to 5 mm, and even more preferably in the range of 200 μm to 3 mm. If the average length "L2" of the second fibers is less than the above lower limit value, for example, when the amount of the first fibers is small, there is a case that it is necessary to set the amount of the second fibers contained in the back-plate composition to a relatively large value in order to increase the reinforcing action which aids the effect obtained by the first fibers. On the other hand, if the average length "L2" of the second fibers exceeds the above upper limit value, when the amount of the first fibers is large, there is a case that the amount of the second fibers that squeeze the gaps between the first fibers decreases.

An average diameter "D1" of the first fibers is preferably in the range of 5 to 20 μm, more preferably in the range of 6 to 18 μm, and even more preferably in the range of 7 to 16 μm. If the average diameter "D1" of the first fibers is less than the above lower limit value, there is a case that the first fibers easily break when molding the back plate 11 depending on the constituent material of the first fibers and the amount thereof. On the other hand, if the average diameter "D1" of the first fibers exceeds the above upper limit value, there is a case that the back plate 11 has variation in strength between areas where the first fibers are present in a relatively large amount and areas where they are present in a relatively small amount.

Further, an average diameter "D2" of the second fibers is preferably in the range of 5 to 20 μm, more preferably in the range of 6 to 18 μm, and even more preferably in the range of 7 to 16 μm. If the average diameter "D2" of the second fibers is less than the above lower limit value, there is a case that the second fibers easily break when molding the back plate 11 depending on the constituent materials of the first fibers and the second fibers and the amounts thereof. On the other hand, if the average diameter "D2" of the second fibers exceeds the above upper limit value, there is a case that the second fibers become difficult to squeeze the gaps between the first fibers depending on the amount of the first fibers.

A cross-sectional shape of each first fiber is not particularly limited, and may be any shape including a substantially circular shape such as a circular shape or an elliptical shape; a polygonal shape such as a triangular shape, a quadrilateral shape or a hexagonal shape; a flat shape; an irregular shape such as a star shape; and the like. Among them, particularly, the cross-sectional shape of each first fiber is preferably the substantially circular shape or the flat shape. This makes it possible to improve smoothness of the surface of the back plate 11.

A cross-sectional shape of each second fiber is not particularly limited, and may be any shape including a substantially circular shape such as a circular shape or an elliptical shape; a polygonal shape such as a triangular shape or a quadrilateral shape; a flat shape; and an irregular shape such as a star shape. Among them, particularly, the cross-sectional shape of each second fiber is preferably the substantially circular shape or the flat shape. This makes it possible to further improve the handling property of the back-plate composition when molding it, to thereby highly increase the moldability thereof.

In the back-plate composition, the first fibers may be present as single bodies, or may be present as fiber bundles in which several first fibers are compactly integrated together. If the first fibers form the fiber bundles, the fiber bundles thereof may be of any shape such as a twisted fiber shape, a linear shape or a netlike shape. The same also applies to the second fibers.

Examples of the first fibers and the second fibers, respectively, include organic fibers such as aramid fibers, acrylic fibers, nylon fibers (aliphatic polyamide fibers) and phenol fibers; inorganic fibers such as glass fibers, carbon fibers, ceramic fibers, rock wool, potassium titanate fibers and basalt fibers; metal fibers such as stainless steel fibers, steel fibers, aluminum fibers, copper fibers, brass fibers and bronze fibers; and the like. One type of them can be used alone, or two or more types of them can be used in combination. Among them, particularly, the first fibers and the second fibers are, respectively, preferably the aramid fibers, the carbon fibers, or the glass fibers, and at least one type of the first fibers and the second fibers (the first fibers and/or the second fibers) are more preferably the glass fibers.

If the glass fibers are used, it is possible to improve homogeneity of the back-plate composition per unit volume, to thereby make the moldability of the back-plate composition particularly good. Furthermore, by improving the homogeneity of the back-plate composition, it is possible to improve uniformity of internal stress in the formed back plate 11, to thereby reduce waviness of the back plate 11. Moreover, it is also possible to further improve wear resistance of the back plate 11 under high load. Further, if the carbon fibers or the aramid fibers are used, it is possible to further improve the mechanical strength of the back plate 11, and to more reduce the weight of the back plate 11.

Concrete examples of glass constituting the glass fibers include E-glass, C-glass, A-glass, S-glass, D-glass, NE-glass, T-glass, and H-glass. Among them, particularly, the E-glass, the T-glass, or the S-glass is preferable as the glass constituting the glass fibers. By using such glass fibers, it is possible to impart higher elasticity to the first fibers and/or the second fibers, and to reduce thermal expansion coefficient thereof.

Moreover, concrete examples of the carbon fibers include high-strength carbon fibers each having a tensile strength of 3,500 MPa or more, and high-elastic modulus carbon fibers each having an elastic modulus of 230 GPa or more. The carbon fibers may be either polyacrylonitrile (PAN) based carbon fibers or pitch-based carbon fibers, but are preferably the polyacrylonitrile based carbon fibers because of their high tensile strength.

Furthermore, aramid resin constituting the aramid fibers may have either a meta type chemical structure or a para type chemical structure.

The first fibers and the second fibers may be, respectively, formed of different materials, but are preferably formed of the same material or the same type of material. By using the same material or the same type of material as the constituent materials of the first fibers and the second fibers, mechanical strengths of the first fibers and the second fibers become close to each other, and thus the handling property thereof when preparing the back-plate composition is further improved.

Here, the phrase "the same type" used in this specification means that if the first fibers are the glass fibers, the second fibers are also the glass fibers. In this regard, differences of glass varieties such as the E-glass, the C-glass are included in the range of "the same type".

Moreover, in this specification, the phrase "the same" means that if both the first fibers and the second fibers are the glass fibers and the first fibers are fibers formed of the E-glass, the second fibers are also fibers formed of the E-glass.

If the first fibers and the second fibers are formed of the same type of material, particularly, the first fibers and the second fibers are preferably the aramid fibers, the carbon fibers, or the glass fibers, and more preferably the glass fibers. In the case where both the first fibers and the second fibers are the glass fibers, the mechanical strengths thereof become close to each other, and the handling property thereof when preparing the back-plate composition becomes better. Furthermore, since both the first fibers and the second fibers can have the above mentioned merits of the glass fibers, the flowability of the back-plate composition is further improved, and the moldability of the back-plate composition is particularly good.

Moreover, in the case where both the first fibers and the second fibers are the glass fibers and are formed of the same glass, particularly, the type of glass is preferably the E-glass. In this case, the above mentioned effects become more remarkable.

It is preferred that at least one type of the first fibers and the second fibers (the first fibers and/or the second fibers) are subjected to a surface treatment in advance.

By subjecting them to the surface treatment in advance, dispersibility of the first fibers and/or the second fibers in the back-plate composition can be increased, an adhesive force thereof with respect to the resin can be increased, and the like.

Examples of a method for such a surface treatment include a coupling agent treatment, an oxidation treatment, an ozone treatment, a plasma treatment, a corona treatment, and a blast treatment. One type of them can be used alone, or two or more types of them can be used in combination. Among them, particularly, the method for the surface treatment is preferably the coupling agent treatment.

The coupling agent used for the coupling agent treatment is not particularly limited, and can be appropriately selected depending on the type of the resin.

Examples of the coupling agent include a silane based coupling agent, a titanium based coupling agent, and an aluminum based coupling agent. One type of them can be used alone, or two or more types of them can be used in combination. Among them, particularly, the coupling agent is preferably the silane based coupling agent. This makes it possible to especially improve adhesiveness of the first fibers and/or the second fibers with respect to the resin.

Examples of the silane based coupling agent include an epoxy silane coupling agent, a cationic silane coupling agent, an amino silane coupling agent, a vinyl silane coupling agent, a mercapto silane coupling agent, a methacrylic silane coupling agent, a chlorosilane coupling agent, an acrylic silane coupling agent, and the like.

In the back plate 11, for example, the first fibers and the second fibers may, respectively, orient along a thickness direction of the back plate 11, may orient along a surface direction of the back plate 11, may orient along a direction inclined at a predetermined angle with respect to the thickness direction or the surface direction of the back plate 11, or may not orient (may be non-oriented). However, of the first fibers and the second fibers, at least the first fibers preferably orient along the surface direction of the back plate 11. This makes it possible to further reduce dimensional variation along the surface direction of the back plate 11. As a result, it is possible to more reliably suppress or prevent deformation such as warpage of the back plate 11. In this regard, the phrase "the first fibers and the second fibers orient along the surface direction of the back plate 11" means a state that the first fibers and the second fibers orient substantially parallel to the surface of the back plate 11.

Furthermore, in the case where the first fibers and/or the second fibers orient along the surface direction of the back plate 11, in a state that the back plate 11 is, as shown in FIG. 5, arranged corresponding to the disc 200, the first fibers and/or the second fibers may be randomly present without orienting along a specific direction within the surface thereof, may orient along a radial direction of the disc 200, may orient along an advancing direction A of the disc 200, or may orient along an intermediate direction (a predetermined direction) of these directions. In this regard, in the case where, of the first fibers and the second fibers, at least the first fibers are randomly present without orienting along the specific direction within the surface thereof, the back plate 11 can have high bending strength and compression strength uniformly in all directions within the surface thereof. Moreover, in the case where at least the first fibers orient along the advancing direction A of the disc 200 braked by the brake pad 10, it is possible to selectively increase the bending strength and the compression strength of the back plate 11 along the advancing direction A of the rotating disc 200. As a result, braking performance of the caliper device 100 provided with the back plate 11 to the disc 200 becomes particularly good. In this regard, the phrase "the first fibers or the second fibers orient along the advancing direction A of the disc 200" means that the first fibers or the second fibers orient along the surface direction of the back plate 11, and orient along the advancing direction A of the disc 200 in a substantially parallel manner.

A total amount of the first fibers and the second fibers contained in the back-plate composition is preferably in the range of 20 to 80 mass %, and more preferably in the range of 30 to 70 mass %. If the total amount of the first fibers and the second fibers is less than the above lower limit value, there is a case that the mechanical strength of the back plate 11 decreases depending on the materials of the first fibers and the second fibers. On the other hand, if the total amount of the first fibers and the second fibers exceeds the above upper limit value, there is a case that the flowability of the back-plate composition decreases when molding the back plate 11.

In the case where the amount of the first fibers contained in the back-plate composition is "X1" [mass %] and the amount of the second fibers contained therein is "X2" [mass %], "X2"/"X1" is preferably in the range of 0.05 to 1, and more preferably in the range of 0.1 to 0.25. If the ratio "X2"/"X1" of the amount of the second fibers to the amount of the first fibers is less than the above lower limit value, when the lengths of the first fibers are relatively long, breakage and the like of the first fibers more easily occurs when manufacturing the back plate 11. On the other hand, if the ratio "X2"/"X1" of the amount of the second fibers to the amount of the first fibers exceeds the above upper limit value, when the lengths of the first fibers are relatively short, the mechanical strength of the back plate 11 often decreases. Further, if the first fibers and the second fibers are formed of the same material or the same type of material, these tendencies become significant.

The amount of the first fibers is preferably in the range of 35 to 80 mass %, more preferably in the range of 40 to 75 mass %, and even more preferably in the range of 50 to 65 mass %. If the amount of the first fibers is less than the above lower limit value, there is a case that shrinkage percentage of the back plate 11 when molding it slightly increases depending on the lengths of the first fibers and the amount of the second fibers. If the amount of the first fibers exceeds the above upper limit value, there is a case that the breakage and the like of the first fibers more easily occurs when manufacturing the back plate 11 depending on the lengths of the first fibers and the amount of the second fibers.

The amount of the second fibers is preferably in the range of 2 to 40 mass %, more preferably in the range of 3 to 35 mass %, and even more preferably in the range of 5 to 30 mass %. If the amount of the second fibers is less than the above lower limit value, there is a case that mechanical properties of the back plate 11 are not sufficiently obtained depending on the lengths of the second fibers and the amount of the first fibers. On the other hand, if the amount of the second fibers exceeds the above upper limit value, there is a case that the flowability of the back-plate composition when molding the back plate 11 is not sufficiently obtained.

In this regard, the back-plate composition may also contain one or a plurality of third fibers, and the like in addition to the plurality of first fibers (the first fiber group) and the plurality of second fibers (the second fiber group) as described above.

As necessary, the back-plate composition may further contain a curing agent, a curing aid agent, a filler, a mold release agent, a pigment, a sensitizer, an acid proliferating agent, a plasticizer, a flame retardant, a stabilizing agent, an antioxidant, an antistatic agent, and the like.

The curing agent can be appropriately selected and used depending on the type and the like of the resin, and is not limited to a specific compound.

For example, if the phenol resin is used as the resin, the curing agent can be selected from epoxy type compounds each having two or more functional groups, isocyanates, hexamethylene tetramine, and the like, and used.

Furthermore, if the epoxy resin is used as the resin, the curing agent can be selected from amine compounds such as aliphatic polyamine, an aromatic polyamine and dicyamine diamide; acid anhydrides such as alicyclic acid anhydrides and aromatic acid anhydrides; polyphenol compounds such as novolac type phenol resins; imidazole compounds; and the like, and used. Among them, the novolac type phenol resin is preferably selected as the curing agent from a viewpoint of handling property and also from an environmental perspective.

In particular, when the phenol novolac type epoxy resin, the cresol novolac type epoxy resin, or the tris(hydroxyphenyl) methane type epoxy resin is used as the epoxy resin, the novolac type phenol resin is preferably selected and used as the curing agent. This makes it possible to improve the heat resistance of a cured product of the back-plate composition (the back plate 11).

In the case where the curing agent is used, an amount of the curing agent contained in the back-plate composition is appropriately set depending on the types and the like of the curing agent and the resin to be used, but is, for example, preferably in the range of 0.1 to 30 mass %. This makes it possible to easily form the back plate 11 into any shapes.

Moreover, as the curing aid agent, an imidazole compound, a tertiary amine compound, an organic phosphorous compound, and the like can be used, but it is not particularly limited thereto.

In the case where the curing aid agent is used, an amount of the curing aid agent contained in the back-plate composition is appropriately set depending on the types and the like of the curing aid agent and the curing agent to be used, but is, for example, preferably in the range of 0.001 to 10 mass %. This makes it possible to more easily cure the back-plate composition, to thereby easily obtain the back plate 11.

Moreover, examples of the filler include, but are not particularly limited to, an inorganic filler, an organic filler, and the like. Examples of the inorganic filler include calcium carbonate, clay, silica, mica, talc, wollastonite, glass beads, milled carbon, graphite, and the like. One type of them can be used alone, or two or more types of them can be used in combination. Moreover, examples of the organic fillers include polyvinyl butyral, acrylonitrile butadiene rubber, pulp, wood powder, and the like. One type of them can be used alone, or two or more types of them can be used in combination. Among them, particularly, the acrylonitrile butadiene rubber is preferably used as the filler (the organic filler) from a viewpoint of further increasing an effect of improving toughness of the back plate 11 (the molded product).

In the case where the filler is used, an amount of the filler contained in the back-plate composition is not particularly limited, but is preferably in the range of 1 to 30 mass %. This makes it possible to further improve the mechanical strength of the back plate 11.

Moreover, as the mold release agent, zinc stearate, calcium stearate, and the like can be used, but it is not particularly limited thereto.

In the case where the mold release agent is used, an amount of the mold release agent contained in the back-plate composition is not particularly limited, but is preferably in the range of 0.01 to 5.0 mass %. This makes it possible to easily mold the back plate 11 into any shapes.

An average thickness of the back plate 11 is not particularly limited, but is preferably in the range of 2 to 12 mm, more preferably in the range of 3 to 10 mm, and even more preferably in the range of 4 to 8 mm. If the thickness of the back plate 11 is less than the above lower limit value, there is a case that the heat resistance of the back plate 11 to the frictional heat generated during braking slightly decreases depending on the type of the resin. On the other hand, if the thickness of the back plate 11 exceeds the above upper limit value, the entire caliper device 100 including the brake pad 10 becomes a slightly large size.

As a method of preparing the back-plate composition, a powder impregnation method utilizing rovings according to the description of, for example, JP-T 2002-509199 can be used.

The powder impregnation method utilizing the rovings is a method of coating a first strand and a second strand by a dry method using fluidized-bed technology. Specifically, first, the other material(s) constituting the back-plate composition besides the first fibers and the second fibers is(are) directly adhered to the first strand and the second strand from a fluidized-bed without being kneaded in advance.

Next, the other material(s) is(are) firmly adhered to the first strand and the second strand by being heated for a short period of time. Then, the first strand and the second strand, which are coated with the above material(s) in this way, are passed through a condition regulating section including a cooling apparatus, and in some cases, including a heating apparatus. Thereafter, the cooled and coated first strand and second strand are collected, and then, respectively, cut to desired lengths, to obtain coated first fibers and coated second fibers. Next, the coated first fibers and the coated second fibers are mixed with each other. In this way, the back-plate composition can be prepared.

Moreover, examples of a method of molding the back plate 11 include compression molding, transfer molding, and injection molding.

By performing the compression molding, it is possible to weaken a degree of orientation of the first fibers and/or the second fibers at a time of molding. For this reason, anisotropy in the back plate 11 can be reduced in physical properties such as the strength distribution, molding shrinkage and linear expansion. Moreover, the compression molding can be appropriately used when molding a back plate 11 having a thick thickness. Further, according to the compression molding, the lengths of the first fibers and the second fibers contained in the back-plate composition can be more stably maintained in the back plate 11 as well. Furthermore, loss of the back-plate composition when molding it can also be reduced.

On the other hand, by performing the transfer molding, it is possible to control dimensions of the back plate 11 to be molded with higher precision. Thus, the transfer molding can be appropriately used for manufacturing a back plate 11 having a complex shape and a back plate 11 requiring high dimensional precision. Moreover, the transfer molding can also be appropriately used for insert molding.

Moreover, by performing the injection molding, it is possible to further shorten molding cycles of the back plate 11. This makes it possible to improve mass producibility of the back plate 11. The injection molding can also be appropriately used for molding a back plate 11 having a complex shape. Furthermore, in the case where the back-plate composition is injected at a high speed, it is possible to control the orientation states of the first fibers and the second fibers in the back plate 11 with higher precision, for example, it is possible to improve the degree of orientation of the first fibers and the second fibers in the back plate 11.

Moreover, examples of a method of manufacturing the brake pad 10 include, but are not particularly limited to, a method of molding the back plate 11, and then attaching (bonding) the back plate 11 to the friction material 12, a method of integrally molding the back plate 11 and the friction material 12, and the like.

[Second Embodiment]

Next, description will be made on a second embodiment of the brake pad of the present invention.

Figure 6:
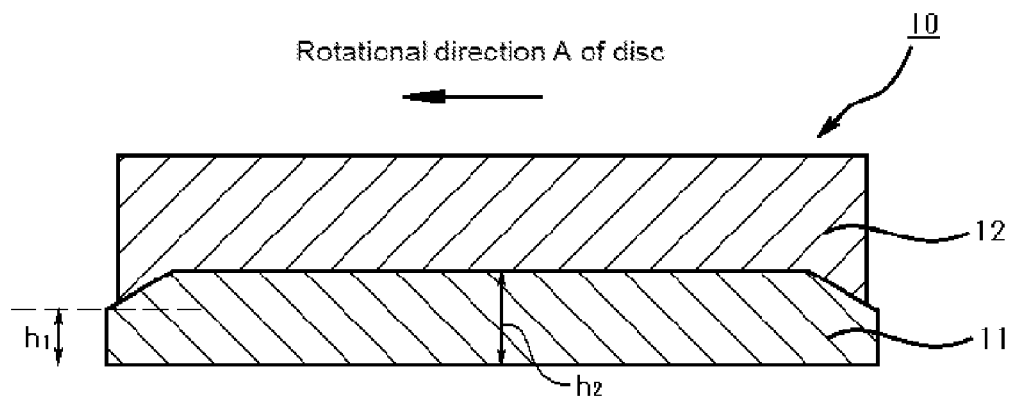
FIG. 6 is a cross-sectional view showing a second embodiment of the brake pad of the present invention.

FIG. 6 is a cross-sectional view showing the second embodiment of the brake pad of the present invention.

Hereinafter, the second embodiment will be described with emphasis placed on points differing from the first embodiment. No description will be made on the same points. In this regard, the same reference numbers are applied to the same portions shown in FIG. 6 as those of the first embodiment.

As shown in FIG. 6, in the brake pad 10 according to this embodiment, the back plate 11 has both end regions of which thicknesses increase toward the central region thereof in the rotational direction of the disc 200 from each of the ends thereof in the rotational direction of the disc 200 by a predetermined distance. Further, the thickness of the back plate 11 does not substantially increase and decrease toward a center thereof from each of the end regions thereof. The brake pad 10 according to this embodiment is different from the above mentioned first embodiment at this point. In such a configuration, a gradient (an angle formed by the rotational direction of the disc 200 and the bonding surface of the back plate 11) of the bonding surface of the back plate 11 at portions (the both end portions) of the back plate 11, where the thicknesses thereof increase, becomes large. As a result, it is possible to further improve the durability of the back plate 11 against the force applied thereto in the rotational direction of the disc 200.

In this regard, in the above mentioned embodiments, the thicknesses of the both ends (the both end regions) of the back plate 11 in the rotational direction of the disc 200 are substantially equal to each other, but may be different from each other.

Further, the back plate 11 may be configured so that the thicknesses of the both ends thereof in the rotational direction of the disc 200 are substantially constant or reduced toward the central region of the back plate 11.

Hereinabove the preferred embodiments of the present invention have been described, but the present invention is not limited thereto.

Moreover, in the above mentioned embodiments, the brake pad was composed of a mono-layer back plate and a mono-layer friction material, but the structure of the brake pad is not limited thereto. For example, the back plate may be composed of a multi-layer laminated body, the friction material may be composed of a multi-layer laminated body, or both the back plate and the friction material may be composed of the multi-layer laminated bodies.

INDUSTRIAL APPLICABILITY

According to the present invention, a brake pad includes a friction material provided on the side of the disc, and a back plate bonded to the friction material on the opposite side of the disc. The back plate is configured so that a thickness of a central region of the back plate in a rotational direction of the disc is larger than thicknesses of both end regions of the back plate in the rotational direction of the disc. This makes it possible to provide a brake pad having high bonding strength between the friction material and the back plate and having excellent durability, and a caliper device provided with the brake pad. Therefore, the present invention has industrially applicability.

What is claimed is:

1. A pair of brake pads for braking a rotation of a disc, the pair of brake pads provided via the disc, each brake pad comprising:
    a friction material provided on the side of the disc; and
    a back plate bonded to the friction material on the opposite side of the disc,
    wherein the friction material has both end portions which are sloped toward the side of the back plate in a rotational direction of the disc and a planar central portion located between the both end portions thereof at a region where the friction material is in contact with the back plate,
    wherein the back plate has both end portions which are sloped toward the side of the friction material in the rotational direction of the disc and a planar central portion located between the both end portions thereof at the region, wherein a thickness of the central portion of the back plate is larger than thicknesses of the both end portions of the back plate, wherein a thickness of the central portion of the friction material is smaller than thicknesses of the both end portions of the friction material, and wherein the both end portions of the back plate are sloped to correspond with the both end portions of the friction material.

2. The pair of brake pads as claimed in claim 1, wherein in the case where a minimum value of the thicknesses of the end portions of the back plate is defined as "$h_1$ [mm]" and a maximum value of the thickness of the central portion of the back plate is defined as "$h_2$ [mm]", $h_1$ and $h_2$ satisfy a relationship of "$h_2-h_1<3$".

3. The pair of brake pads as claimed in claim 1, wherein a minimum value of the thicknesses of the end portions of the back plate is in the range of 3 to 5 mm.

4. The pair of brake pads as claimed in claim 1, wherein a maximum value of the thickness of the central portion of the back plate is in the range of 4 to 7 mm.

5. The pair of brake pads as claimed in claim 1, wherein the back plate is formed of a back-plate composition including a resin and a plurality of fibers.

6. The pair of brake pads as claimed in claim 5, wherein the fibers are glass fibers.

7. The pair of brake pads as claimed in claim 5, wherein the resin contains at least one type selected from the group consisting of phenol resin, epoxy resin, bismaleimide resin, benzoxazine resin, and unsaturated polyester resin.

8. A caliper device comprising:
the pair of brake pads defined by claim 1;
a pair of pistons that press the pair of brake pad toward the disc; and
a caliper in which the pair of pistons are put so as to be movable.

9. The pair of brake pads as claimed in claim 1, wherein the central portion of the back plate is protruded more than the both end portions of the back plate toward the side of the friction material.

10. The pair of brake pads as claimed in claim 1, wherein the both end portions of the friction material are linearly sloped toward the side of the back plate and the both end portions of the back plate are linearly sloped toward the side of the friction material.

\* \* \* \* \*